(12) United States Patent
Lee (10) Patent No.: US 7,181,967 B2
(45) Date of Patent: Feb. 27, 2007

(54) ENHANCEMENT OF SENSORS FOR AIRBORNE OPERATION

(75) Inventor: James Beresford Lee, New Lambton Heights (AU)

(73) Assignee: BHP Billiton Innovation Pty Ltd, Melbourne (AU)

( * ) Notice: Subject to any disclaimer, the term of this patent is extended or adjusted under 35 U.S.C. 154(b) by 0 days.

(21) Appl. No.: 10/508,045

(22) PCT Filed: Mar. 12, 2003

(86) PCT No.: PCT/AU03/00297

§ 371 (c)(1),
(2), (4) Date: Mar. 24, 2005

(87) PCT Pub. No.: WO03/079052

PCT Pub. Date: Sep. 25, 2003

(65) Prior Publication Data

US 2005/0160815 A1    Jul. 28, 2005

(30) Foreign Application Priority Data

Mar. 18, 2002   (AU)   ..................... PS1147

(51) Int. Cl.
*G01V 7/02*   (2006.01)

(52) U.S. Cl. .................................................. 73/382 G
(58) Field of Classification Search ............. 73/382 G, 73/382 R, 1.38, 1.39; 702/2, 5
See application file for complete search history.

(56) References Cited

U.S. PATENT DOCUMENTS

| | | | | | |
|---|---|---|---|---|---|
| 4,718,274 | A | * | 1/1988 | Bell et al. ................. | 73/382 R |
| 5,339,684 | A | * | 8/1994 | Jircitano et al. .......... | 73/178 R |
| 5,357,802 | A | * | 10/1994 | Hofmeyer et al. ........ | 73/382 G |
| 5,922,951 | A | * | 7/1999 | O'Keefe et al. .......... | 73/382 G |
| 5,962,782 | A | * | 10/1999 | O'Keefe et al. .......... | 73/382 R |
| 6,152,226 | A | * | 11/2000 | Talwani et al. .......... | 166/252.4 |
| 6,658,935 | B1 | * | 12/2003 | Feinberg ................... | 73/382 G |
| 6,799,459 | B2 | * | 10/2004 | Dosch et al. ............. | 73/382 G |

* cited by examiner

*Primary Examiner*—Helen Kwok
(74) *Attorney, Agent, or Firm*—DLA Piper US LLP (57) ABSTRACT

Gravity gradiometers (or gravity gradient instrument, GGI) measure one or more components of the gradient of gravity which is expressed as the gradient of a gravity vector. One or more feedback loops extend from the instrument output to one or more of the accelerometers (1–4) to compensate for errors. The feedback loops include one or more inputs in addition to the instrument output. The additional inputs include signals representing one or more of: components of attitude, velocity and acceleration, the physical environment and flight conditions, taken alone or in combination.

19 Claims, 6 Drawing Sheets

# ENHANCEMENT OF SENSORS FOR AIRBORNE OPERATION

CROSS REFERENCE TO RELATED APPLICATIONS

This application claims the benefit of priority under 35 USC § 119(a)–(d) of International Application No. PCT/AU03/00297, with an international filing date of 12 Mar. 2003, which claims priority to Australian Application No. PS 1147, filed 18 Mar. 2002, which are incorporated herein by reference in their entirety.

TECHNICAL FIELD

This invention concerns improvements in the performance of a mobile gravity gradient instrument (GGI). Gravity gradiometers measure one or more components of the gradient of gravity which is expressed as the gradient of a gravity vector, or in other words a tensor, which may be written as follows:

$$\begin{vmatrix} g_{xx} & g_{yx} & g_{zx} \\ g_{xy} & g_{yy} & g_{zy} \\ g_{xz} & g_{yz} & g_{zz} \end{vmatrix} \begin{array}{l} \text{units are Eotvos} \\ \text{or in } 10^{-9} \text{ sec}^{-2}, \text{ or equivalent} \end{array}$$

These devices should not be confused with gravimeters which measure the gravitational field, for instance by measuring the weight of a known mass within the gravitational field.

There is interest in improving the performance of the GGI in an aircraft for the purpose of detecting gravity disturbances caused by geological density anomalies associated with economic mineral or hydrocarbon deposits.

BACKGROUND ART

Measurements of gravity can be made from aircraft, and are routinely used in some resource exploration, particularly petroleum exploration. A measurement of gravity gradient is preferred for detection of gravity disturbances from an airborne platform, because the direct measurement of gravity cannot distinguish the gravity signal from accelerations associated with the motion of the aircraft. This effect is more pronounced at low altitude surveying, preferred in mineral exploration to improve spatial resolution of the survey, because of the prevalence of atmospheric turbulence close to the ground surface. An ideal gravity gradient measurement will not be sensitive to the motion of the measurement instrument.

A principal source of measurement noise (error) is residual sensitivity of the GGI to motion. The magnitude of the gravity gradient signal expected from an economic mineral deposit is in the range of 1–100 Eotvos (1 Eotvos=$10^{-9}$ (m/s$^2$)/m). Accelerations experienced in a survey aircraft during low level surveys are generally of the order of 1 m/s$^2$ and the GGI has a baseline length of 10 cm. The acceleration rejection of the GGI therefore must be of the order of one part in $10^9$. The GGI incorporates some mechanisms to achieve high rejection of acceleration but further improvements are required to enable those mechanisms to operate more effectively.

SUMMARY OF THE INVENTION

The invention is a gravity gradient instrument, comprising:

a first, second, third and fourth accelerometer equally spaced around the circumference of a circle, with their sensitive axes tangential to the circle, and arranged in opposing pairs with the first accelerometer opposite the second, and the third accelerometer opposite the fourth; in use the accelerometers are spun around an axis normal to the circle and passing through its centre;

a summing amplifier which receives the outputs of the accelerometers and combines them in a manner to cancel the common mode output signals, to produce an instrument output; and one or more feedback loops extending from the instrument output to one or more of the accelerometers to compensate for errors; the feedback loops including one or more additional inputs over and above the instrument output Those additional inputs including one or more of the following, taken alone or in combination.

Signals measuring one, two or three components of the acceleration environment of the gravity gradient instrument. These signals may be derived from accelerometers used on the inertial platform on which the gravity gradient instrument is usually mounted.

Signals measuring one, two or three components of the acceleration environment of the gravity gradient instrument rotor. The signals measuring the acceleration components in the plane of the gravity gradient instrument accelerometers may come from those accelerometers.

Signals measuring the attitude of the aircraft (roll, pitch and heading).

Signals measuring the rotational rates of the gravity gradient instrument.

Signals measuring the physical environment of the gravity gradient instrument.

Signals representing the flight conditions of the airborne instrument, such conditions including fuel levels on survey; in turn between survey lines; takeoff, climb/descend. These signals may be automatically determined from flight instruments or may be manually entered by an operator or pilot.

The enhanced feedback loops may be implemented as a part of the gravity gradient instrument and its support electronics. They may also be implemented by means of an external processing unit connected to the gravity gradient instrument. This implementation has the benefit of requiring minimal change to the gravity gradient instrument itself.

The operation of prior art feedback loops may in some circumstances be detrimental to the operation of the gravity gradient instrument. The extent to which the operation of a feedback loop is beneficial or detrimental to the operation of the gravity gradient instrument can be determined from the above identified additional inputs to the feedback loops, and the gain or operation of the feedback loop adjusted appropriately.

The sensitivity of the gravity gradient instrument to an acceleration stimulus may be determined by correlating the instrument output with a measurement of the stimulus. The feedback loop may then operate by applying feedback to an accelerometer to remove that sensitivity on the basis of the determined correlation.

The sensitivity of the gravity gradient instrument to its environment, as measured by the above identified additional inputs, may likewise be determined by a correlation process. Once determined this sensitivity model can be used to determine what contribution these sensitivities make to the output of the gravity gradient instrument. Subtraction of this component from the instrument output as it is applied to the feedback loop reduces the noise on this primary input to the feedback loops and in turn further reduces the noise on the gravity gradient instrument output.

BRIEF DESCRIPTION OF THE DRAWINGS

An example of the invention will now be described with reference to the accompanying drawings, in which.

BEST MODES OF THE INVENTION

Figure 1:
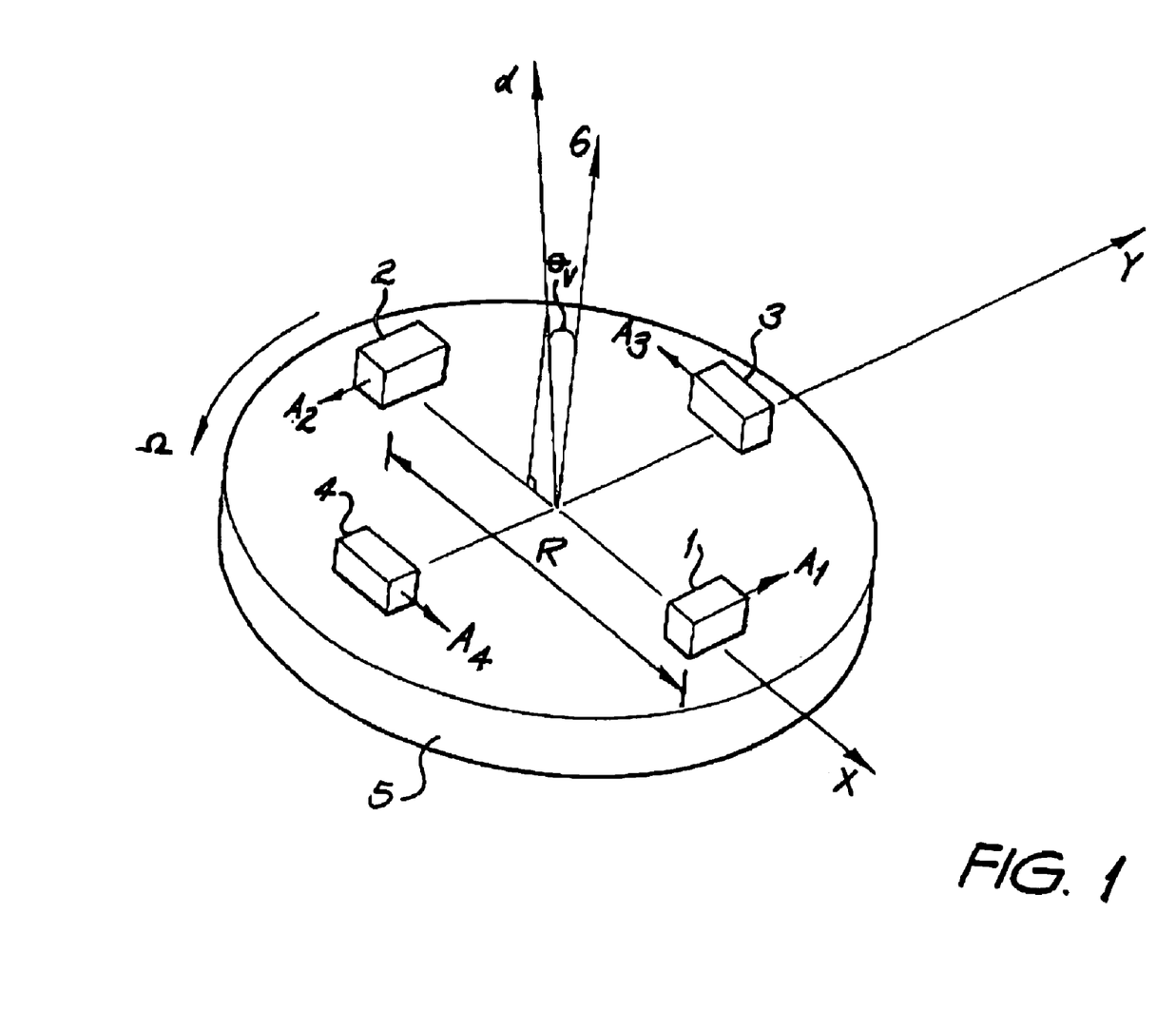
FIG. 1 is a gravity gradiometer instrument having four accelerometers.

Referring first to FIG. 1, the GGI consists of four, 1, 2, 3 and 4 (or eight) high quality, low noise, matched accelerometers mounted on a block 5 as shown in FIG. 1. Each of the GGI accelerometers has mechanisms for trim adjustment of: the accelerometer scale factor, and the alignment of the accelerometer sensitive axis. The alignment trim adjustment is nominally about the accelerometer output axis.

The nominal configuration of the GGI accelerometers has the accelerometers 1, 2, 3 and 4 equally spaced on the circumference of a circle, with their sensitive axes tangential to the circle. The block is rotated about an axis 6 (the spin axis) which is nominally and to a high precision perpendicular to the plane of the circle, and passes through the centre of the circle. The rotation rate ($\Omega$) is usually 0.25 Hz and can vary from 0.25 Hz to 1.67 Hz.

Figure 2:
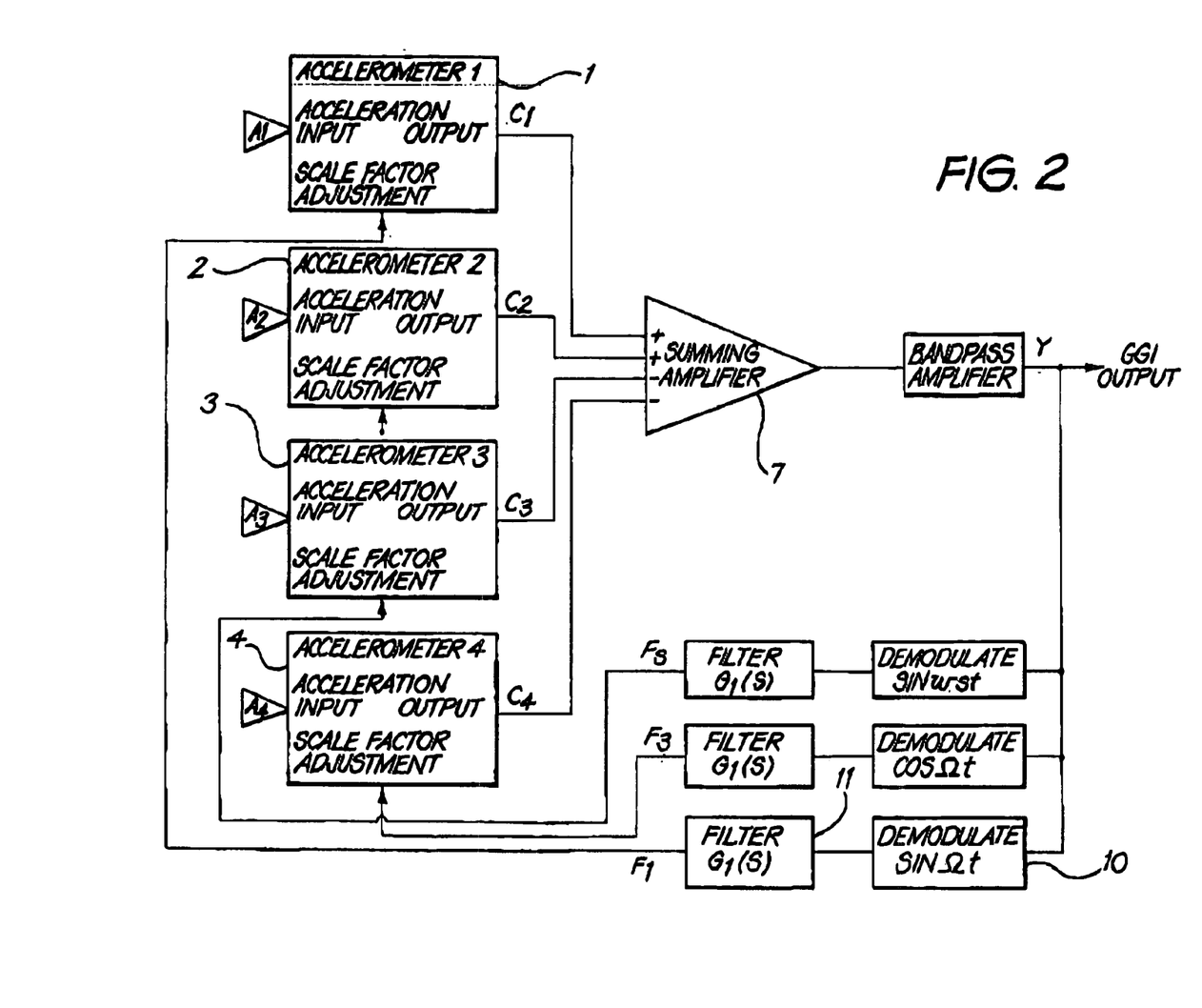
FIG. 2 is a block diagram of known active feedback loops.

The outputs of the four accelerometers are combined by a summing amplifier 7 as shown in FIG. 2. This combining of the outputs must be done in a way which allows the large common mode accelerometer output signals to cancel to a high degree of precision, so that the residual differences which constitute the gradient signal are observable. In FIG. 2 the outputs from accelerometers 3 and 4 are subtracted from the outputs from accelerometers 1 and 2 to achieve common mode cancellation.

In the nominal configuration of the GGI and if the accelerometer sensitivities are exactly equal, the GGI is not sensitive to translational accelerations or to rotations about the spin axis. The GGI retains a sensitivity to the rate of rotation about axes in the plane of the circle (X and Y in FIG. 1), and this source of noise (error) is reduced by mounting the GGI in a high quality inertially stabilised gimbals.

The GGI will have a residual sensitivity to translational motion which is the result of, and proportional to, the difference in the sensitivities of each diametrically opposite pair of accelerometers.

The GGI of FIG. 2 incorporates active feedback control to continuously match the sensitivities of the accelerometers in each pair called Scale factor feedback. These feedback controls require there to be a distinct signal in the GGI output which is the result of the mismatch of sensitivity of a pair of accelerometers. Such a signal occurs when the spin axis is inclined from the vertical $\alpha$ (FIG. 1). This results in each accelerometer sensing the gravitational acceleration modulated by the rotation of the GGI rotor. The resultant component of the GGI output is $\Delta_{12}$ Kg sin ($\theta_v$) sin ($\Omega t$) for one pair and $\Delta_{34}$ Kg sin ($\theta_v$) cos ($\Omega t$) for the other pair. The active feedback controls sense the magnitude of these signals by synchronous demodulation of the GGI output, and adjust the sensitivity of one of the accelerometers of the corresponding pair to null the signal. $\theta_v$, is the angle by which the GGI spin axis is tilted from the vertical.

The GGI will have a residual sensitivity to rotational accelerations about the spin axis whenever there is a mismatch in the mean sensitivities of the two pairs of the accelerometers. The GGI also incorporates a feedback control to adjust this mismatch by adjusting the sensitivity of a third accelerometer. This is called spin modulation, or scale factor pair feedback. This loop relies on active modulation of the GGI spin rate at another frequency (typically 1.8 Hz) to provide the feedback signal. The resultant component of the GGI output is $(\Sigma_{12}K-\Sigma_{34}K)\theta_s\omega_s^2 \sin(\omega_s t)$. The active feedback control senses the magnitude of this signal by demodulation of the GGI output, and adjusts the sensitivity of one of the accelerometers of the set of four to null out the signal. $\theta_s$ is the angular amplitude of the spin modulation.

The active feedback loops are shown schematically in FIG. 2. For each loop the output of the GGI is demodulated by multiplication by a sinusoidal signal at the frequency of the loop stimulus and in phase with the residual response to that stimulus. The demodulated signal is passed through a low pass filter including an integrator before being fed back to the appropriate accelerometer control point.

Gravity Gradient Instruments operated with compensation loops as described above do not always function as intended in airborne operation. These loops function by detection of a signal component in the output of the GGI which is dependent on an input stimulus. For the primary compensations which correct for mis-match of accelerometer sensitivity between pairs of accelerometers, this stimulus is the component of the Earth gravity vector in the tilted plane of the GGI rotor. In airborne operation, for example when the aircraft executes a turn, there is a considerable additional acceleration term in the horizontal plane, which adds as a vector sense to the Earth gravity vector.

As this additional acceleration is typically a considerable fraction of the Earth's gravity, the stimulus to this compensation loop is changed and the loop will function abnormally. In the case of a small tilt angle to the GGI, the action of the compensation loop can be reversed, so that its effect is to drive the accelerometer scale factors apart, rather than making them equal. The effect of this is to make the GGI more sensitive to the acceleration environment of the aircraft, negating the benefit from a gradiometric measurement.

Figure 3:
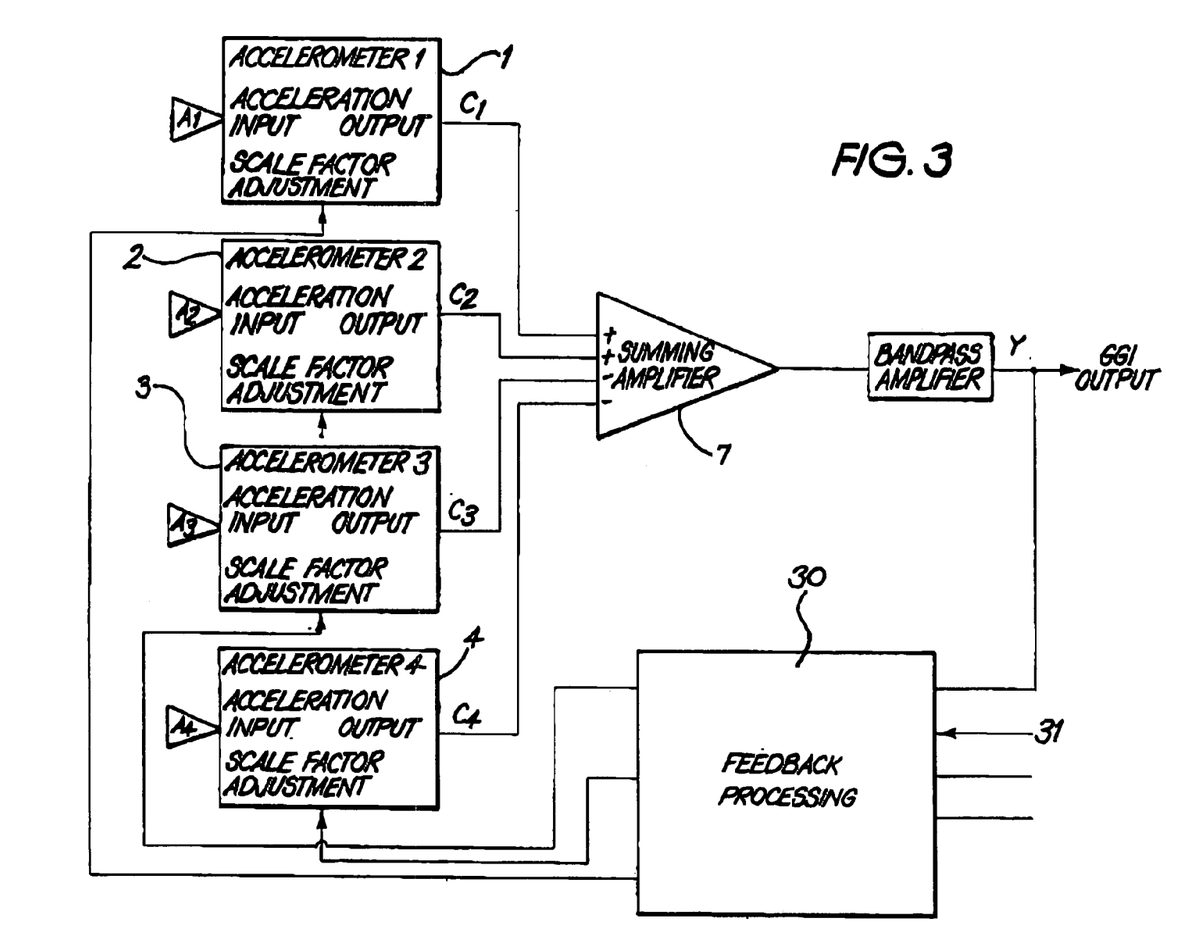
FIG. 3 is a block diagram of the active feedback loops used in the invention.
Figure 4:
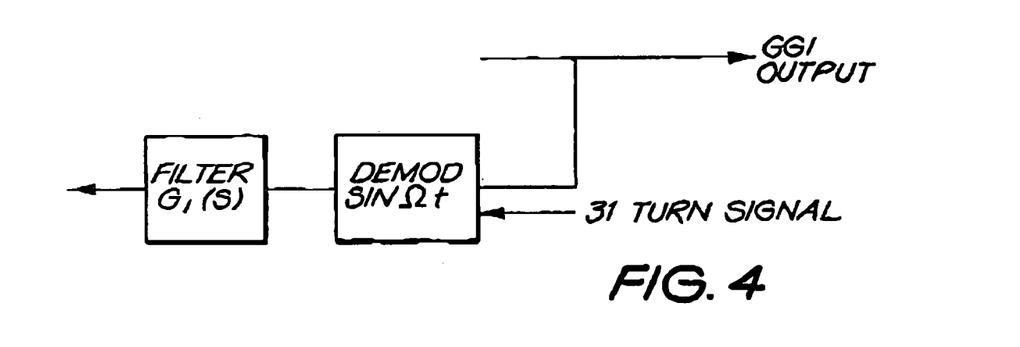
FIGS. 4 to 10 are block diagrams illustrating various ways in which the active feedback loops of the invention may be applied to the known feedback loops of FIG. 2.

Referring now to FIG. 3. The active feedback 30 of the invention uses one or more external signals 31 to alter the operation of the feedback loop. This feedback loop may include as before a demodulation function followed by a filter function. As shown in FIG. 4 the external signal may be a signal indicating the aircraft is turning and this is used to alter the operation of the feedback loop during the turn. This signal could be derived from the aircraft controls; the aircraft instruments; the pilot or operator; or from the acceleration environment of the gravity gradient instrument exceeding a threshold level of horizontal acceleration.

The demodulation function in the prior art feedback loops effects a correlation of the output of the gravity gradient instrument with assumed acceleration environment of the accelerometer pair on which the feedback operates, where the assumed acceleration environment is just the stationary Earth gravity vector coupled with the tilt of the gravity gradient instrument. It is when this assumed acceleration environment is wrong in sign, that the compensation loop is detrimental to the operation of the gravity gradient instrument.

Figure 5:
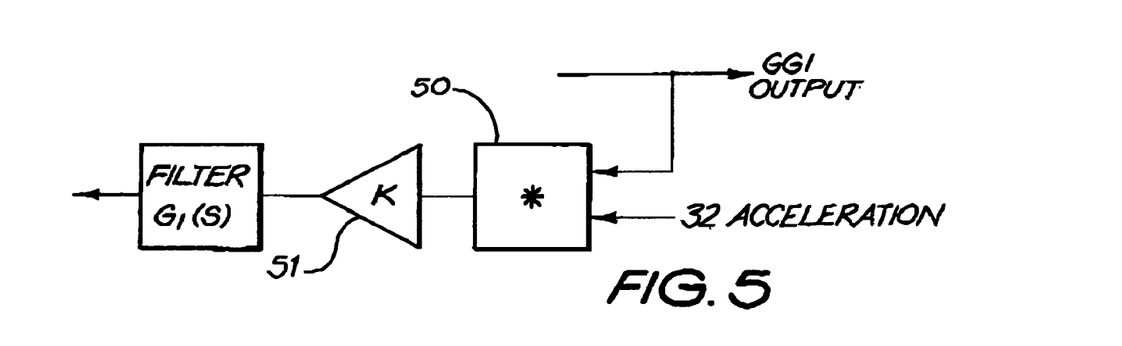

Therefore another mode of operation of the feedback loop is to use a correlation of the gravity gradient instrument output with the actual acceleration environment of the accelerometer pair. This involves, in the place of the demodulation function, forming the product 50 of the instrument output and the acceleration 32 measured by one accelerometer of the pair being compensated by the feedback loop and applying a constant gain 51 related to the magnitude of the acceleration environment. This is shown in FIG. 5.

It is recognised that this scheme would allow the gravity gradient instrument to operate without tilt in a dynamic situation and that this may have further benefit to its performance.

It is recognised that the acceleration 32 can also be derived from other measures of the acceleration of the gravity gradient instrument.

The filter function is a low pass filter used to reduce high frequency noise on the output of the compensation feedback as this contributes to the noise on the output of the gravity gradient instrument. The bandwidth of this filter is a trade-off between increased noise on the output of the gravity gradient instrument from noise on the feedback, as the filter bandwidth is increased; and increased noise on the output of the gravity gradient instrument from reduced compensation of the sensitivity which the feedback is compensating, as the filter bandwidth is decreased. The amount of noise from the second of these effects is proportional to the amount of acceleration experienced by the gravity gradient instrument and when there is a higher acceleration level, it is desirable to increase the gain of the feedback loop to better compensate the sensitivity.

Figure 6:
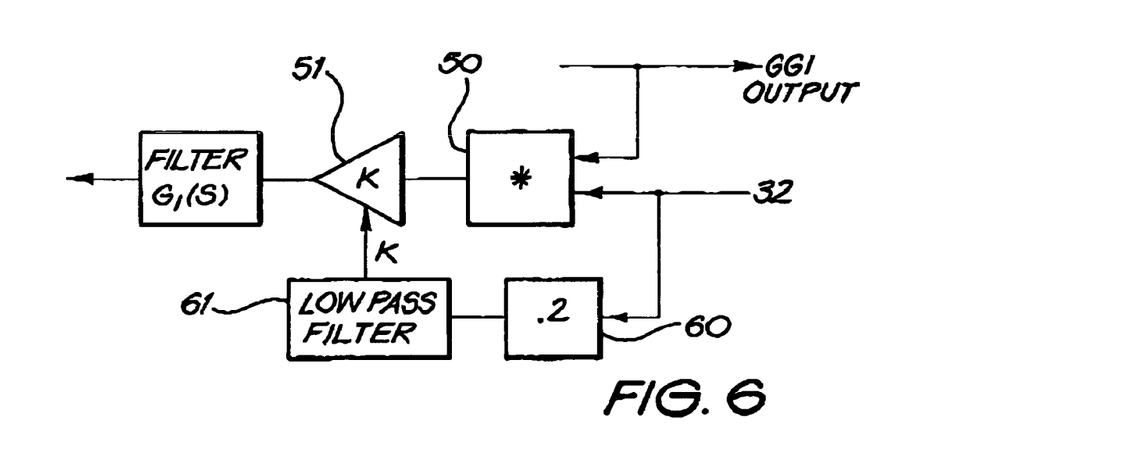

This can be achieved by (in parallel) forming the square 60 of the acceleration input; passing this through a low pass filter 61; and using the output of this filter, or a function of it, to determine the gain to be applied in the feedback. As shown in FIG. 6.

Figure 7:
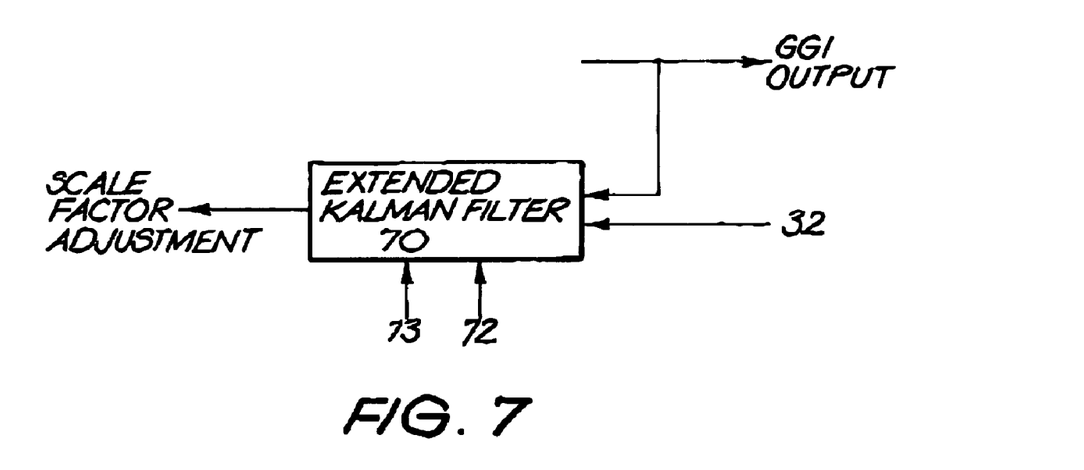

The optimum gain to be applied in the feedback loop is also dependent on the level of noise in the output of the gravity gradient instrument, particularly that component which is not a result of the sensitivity which the feedback loop is effecting, and on the characteristics of the variation of the sensitivity which the feedback loop is tracking. Parameters (either static or determined dynamically) representing these factors 72, 73 may be combined with the instrument output and the acceleration 32 in a Kalman filter to generate the measure of the mismatch of scale factors which is required to drive the feedback as shown in FIG. 7. The Kalman filter provides the optimum gain in linear systems, however this feedback system is non-linear and it is not guaranteed that the result is optimum. An extended Kalman filter is applicable to non-linear systems (S. M. Kay, Fundamentals of statistical signal processing: Estimation theory. Prentice Hall, 1993).

The Kalman filter 70 incorporates a model of the component of the gravity gradient instrument output which results from the sensitivity (scale factor mis-match) which the feedback loop is tracking. That model is simply the product of the sensitivity (which is being estimated by the Kalman filter) and the acceleration 32.

In all cases the noise on the output of the compensation feedback loop is derived from the noise on the output of the gravity gradient instrument. Application of linear regression techniques to the gravity gradient instrument output shows that a large part of this noise is usually due to residual uncompensated sensitivity to the acceleration environment of the instrument and that it can be removed by the regression.

Further enhancement of the compensation loops can be obtained by removal of this deterministic noise from the output of the gravity gradient instrument prior to, or as part of the feedback loop. The generic implementation of this 90 is shown in FIG. 8.

Figure 8:
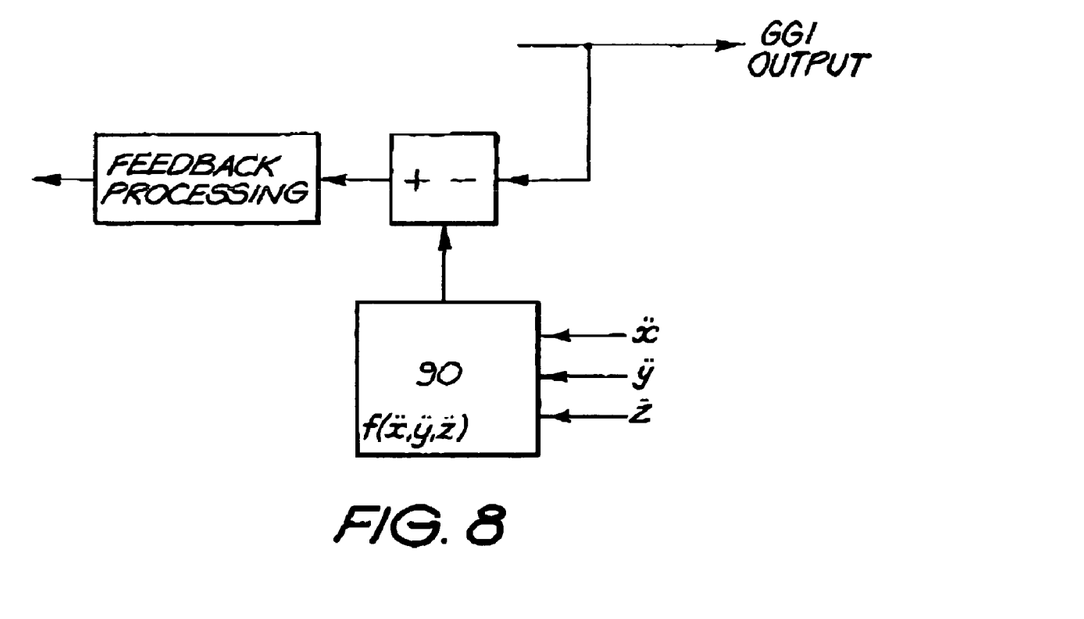

The determination of the sensitivity function, $f(\ddot{x},\ddot{y},\ddot{z})$ used in the scheme of FIG. 8 could be on the basis of processing of previously acquired data, but it can also be determined during the processing in the feedback loops. The schemes of FIGS. 4, 5, 6, and 7 are all suitable for estimation of some of the parameters needed for the scheme of FIG. 8. These and additional parameters (Grierson, A. D., 1990, Gravity gradiometer survey system stage I data reduction: Proc. of Seventeenth Annual Gravity Gradiometer Conf., GL-TR-90-0067, ADA223568, Geophysics Laboratory, Air Force Systems Command, Hanscom Air Force Base provides a suitable model of the sensitivities) may also be estimated by a regression technique. A preferred approach is to extend the Kalman filter of FIG. 7 to incorporate these sensitivities as part of its system model, as an extended vector Kalman filter.

It is further recognised that components of the gravity gradient output which will act as noise in the compensation loops, are measured gravity gradients. These gradients include the self gradient of the survey system including the aircraft in which the system is mounted, which is a function of the attitude of the aircraft; and the acceleration gradients due to rotation of the gravity gradient instrument are a function of the rotation rates of the instrument.

Figure 9:
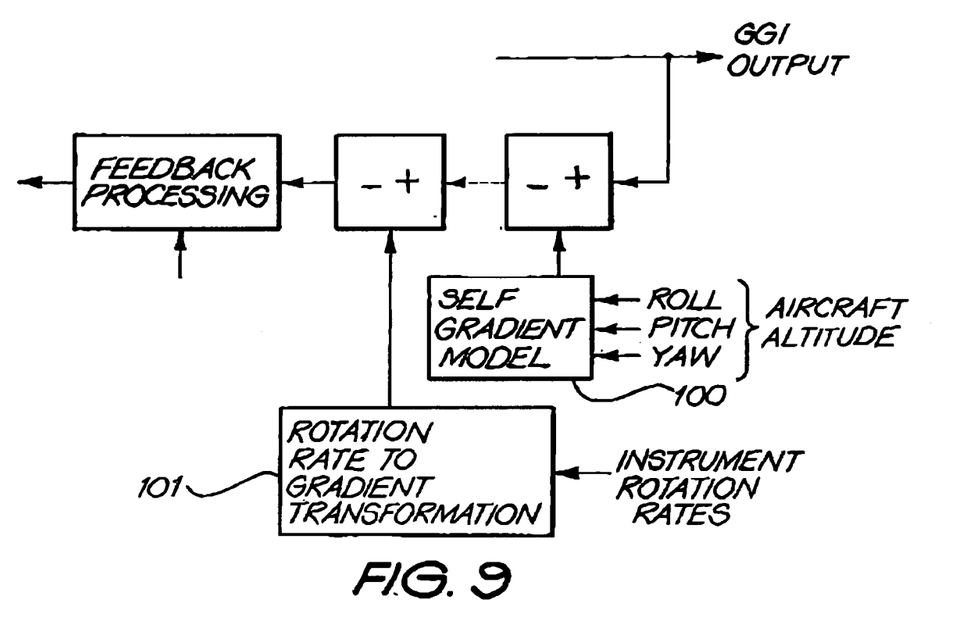

These signals can therefore be subtracted from the output of the gravity gradient instrument as the first stage of the feedback compensations; see FIG. 9.

The system model incorporated in particular in the schemes described using a Kalman filter can be extended to include other known influences of measurable parameters on the sensitivities of the gravity gradient instrument As an example the gravity gradient instrument is known to be very sensitive to temperature variation, thus a measure of the temperature of the gravity gradient instrument can be used as a parameter in the model of the instrument output to further improve the performance of the compensations.

Figure 10:
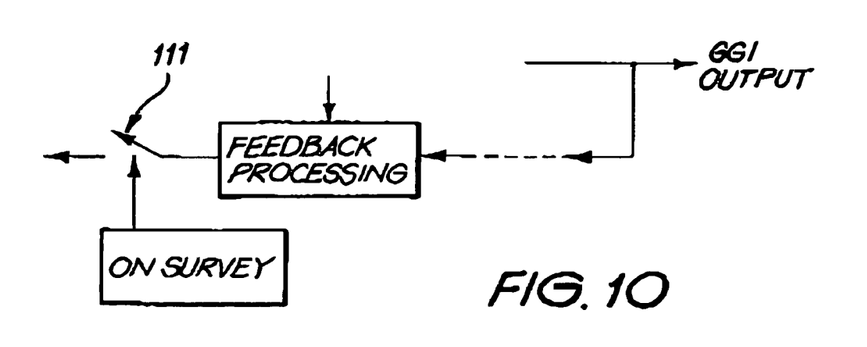

It is further recognised that the least noise on the output of the gravity gradient instrument, from the feedback loops is obtained when the loops are not active. Therefore another mode of operation is to interrupt output of the compensation loops using switch 111 at any time that the instrument is gathering data (on survey), but allow processing by the feedback loops during this time, and then reconnect the output of the loop to the gravity gradient instrument accelerometer control point when the instrument is not being used to gather data (for example during turns at the end of survey lines) See FIG. 10.

The Figures show only one feedback. The schemes are applicable to multiple parallel feedbacks. The schemes can be mixed and several applied to a single feedback, particularly FIG. 10 in association with any other scheme.

Physical Implementation

One mode of implementation of the invention is an external computational device which receives data from the gravity gradient instrument, for example as data being recorded to a file on the external device. A further communication link or an electrical interface allows the external device to communicate the output of its feedback compensation loops to the appropriate control points on the accelerometers of the gravity gradient instrument.

Another mode of implementation would implement the combination of the signals required for these enhanced compensation feedbacks as modifications of the feedback processing of the prior art compensations.

The invention claimed is:

1. A gravity gradient instrument, comprising:
   a first, second, third and fourth accelerometer equally spaced around the circumference of a circle, with the accelerometer sensitive axes tangential to the circle, and arranged in opposing pairs with the first accelerometer opposite the second accelerometer and the third accelerometer opposite the fourth accelerometer; in use the accelerometers are spun around an axis normal to the circle and passing through the circle's centre;
   a summing amplifier which receives outputs of the accelerometers and combines them in a manner to cancel common mode output signals, to produce an instrument output; and
   one or more feedback loops extending from the instrument output to one or more of the accelerometers to compensate for errors; wherein the feedback loop or loops include one or more additional inputs in addition to the instrument output, the additional inputs including signals representing one or more of: components of attitude, velocity and acceleration, the physical environment and flight conditions, taken alone or in combination.

2. A gravity gradient instrument according to claim 1, wherein the additional inputs include signals measuring one, two or three components of the acceleration environment of the gravity gradient instrument.

3. A gravity gradient instrument according to claim 2, wherein the gravity gradient instrument is mounted on an internal platform and the signals are derived from the accelerometers used on the inertial platform.

4. A gravity gradient instrument according to claim 1, wherein the additional inputs include signals measuring one, two, or three components of accelerations experienced by the gravity gradient instrument.

5. A gravity gradient instrument according to claim 4, wherein the signals measuring the components of acceleration in the plane of the gravity gradient instrument accelerometers come from the gravity gradient instrument accelerometers.

6. A gravity gradient instrument according to claim 1, wherein the additional inputs include signals measuring the attitude of an aircraft.

7. A gravity gradient instrument according to claim 1, wherein the additional inputs include signals measuring rotational rates of the gravity gradient instrument.

8. A gravity gradient instrument according to claim 1, wherein the additional inputs include signals measuring the physical environment of the gravity gradient.

9. A gravity gradient instrument according to claim 1, wherein the additional inputs include signals representing the flight conditions of an airborne instrument.

10. A gravity gradient instrument according to claim 9, where the conditions include fuel levels on survey.

11. A gravity gradient instrument according to claim 9, where the conditions include turns between survey lines.

12. A gravity gradient instrument according to claim 9, where the conditions include take-off.

13. A gravity gradient instrument according to claim 9, where the conditions include climb or descend.

14. A gravity gradient instrument according to claim 9, where the signals are automatically determined from flight instruments.

15. A gravity gradient instrument according to claim 1, wherein the feedback loops are implemented as a part of the gravity gradient instrument and the gravity gradient instruments support electronics.

16. A gravity gradient instrument according to claim 1, wherein the feedback loops are implemented by means of an external processing unit connected to the gradient instrument.

17. A gravity gradient instrument according to claim 1, wherein the additional inputs are used to determine the performance of a feedback loop and the gain or operation of said feedback loop is then adjusted.

18. A gravity gradient instrument according to claim 1, wherein the sensitivity of the gravity gradient instrument to an acceleration stimulus is determined by correlating the instrument output with a measurement of the stimulus and then applying feedback to one of the first, second, third or fourth accelerometers to remove that sensitivity on the basis of the determined correlation.

19. A gravity gradient instrument according to claim 1, wherein the sensitivity of the gravity gradient instrument to errors, as measured by respective additional inputs, is determined by a correlation process, then the contribution the sensitivity relating to each additional input makes to the output of the gravity gradient instrument is determined and this contribution is subtracted from the instrument output as it is applied to the feedback loop to reduce the noise of this primary input to a respective feedback.

* * * * *